United States Patent
Popov et al.

(10) Patent No.: US 6,665,115 B2
(45) Date of Patent: Dec. 16, 2003

(54) USE OF OPA FOR SWITCHING AND ROUTING IN WDM NETWORKS

(75) Inventors: Sergei Popov, Årsta (SE); Evgeny Vanin, Alvsjö (SE)

(73) Assignee: Telefonaktiebolaget LM Ericsson (publ), Stockholm (DE)

(*) Notice: Subject to any disclaimer, the term of this patent is extended or adjusted under 35 U.S.C. 154(b) by 0 days.

(21) Appl. No.: 09/971,088

(22) Filed: Oct. 5, 2001

(65) Prior Publication Data

US 2002/0048079 A1 Apr. 25, 2002

Related U.S. Application Data

(60) Provisional application No. 60/242,452, filed on Oct. 24, 2000.

(51) Int. Cl.[7] .................................................. H01S 3/00
(52) U.S. Cl. ........................................ 359/337; 359/333
(58) Field of Search ................................ 359/333, 330, 359/337

(56) References Cited

U.S. PATENT DOCUMENTS

| | | | |
|---|---|---|---|
| 5,596,667 A | * 1/1997 | Watanabe | 385/122 |
| 6,175,435 B1 | * 1/2001 | Watanabe | 359/161 |
| 6,344,921 B1 | * 2/2002 | Galvanauskas et al. | 359/332 |
| 6,433,919 B1 | * 8/2002 | Chowdhury et al. | 359/332 |
| 2002/0149836 A1 | * 10/2002 | Jovanovic et al. | 359/328 |
| 2002/0171913 A1 | * 11/2002 | Batchko et al. | 359/333 |

FOREIGN PATENT DOCUMENTS

| | | | |
|---|---|---|---|
| EP | 0 708 357 A | 4/1996 | G02F/1/35 |
| EP | 0 776 103 A | 5/1997 | H04B/10/18 |
| EP | 0 862 078 A | 9/1998 | G02F/1/35 |
| EP | 0 907 266 A | 4/1999 | H04J/14/02 |
| JP | 02000329618 A | * 11/2000 | G01J/11/00 |

OTHER PUBLICATIONS

Desurvire, E. On the Physical Origin of the 3dB noise figure limit in laser and parametric optical amplifiers. Optical Amplifiers and Their Appliations. 1998. Optical Society of America. pp. 125–128.*

* cited by examiner

Primary Examiner—Thomas G. Black
Assistant Examiner—Deandra M. Hughes
(74) Attorney, Agent, or Firm—Nixon & Vanderhye, P.C.

(57) ABSTRACT

The present invention is an arrangement for utilizing optical information sent through an optical network from a sending site to at least one receiving site. An optical parametric amplifier OPA receives the optical information sent at a set of input wavelengths. A mixer amplifier mixes the input wavelengths with an optical pump wavelength. A set of optical conjugate copy wavelengths are generated from the set of input wavelengths. A WDM-splitter separates the set of input wavelengths from the set of conjugate copy wavelengths. The set of input wavelengths and/or the set of conjugate copy wavelengths are forwarded individually to the at least one of the receiving site.

7 Claims, 7 Drawing Sheets

USE OF OPA FOR SWITCHING AND ROUTING IN WDM NETWORKS

This application claims the benefit of provisional application No. 60/242,452 filed Oct. 24, 2001.

TECHNICAL FIELD OF THE INVENTION

The present invention relates to a method and an arrangement to provide efficient transmission of optical information in an optical transmission system.

DESCRIPTION OF RELATED ART

Optical transmission systems using optical fiber as the optical signal transmission medium are gaining in popularity. This is especially because of optical fiber's substantial immunity to interference or external influences and its ability to transmit a great number of communications channels in the same physical medium the optical fiber without cross talk between the channels.

Modem optical networks contain a number of different optical devices to manipulate information in the form of optical signals transmitted through a network of optical fiber links. The main design principles of optical networks require versatile processing of optical signals to provide necessary network flexibility. Such processing assumes channel routing, add/drop and switching functions, conversion of optical signals from one to another wavelength channel, amplification of optical signals. etc. For high-speed transmission, the effect of chromatic dispersion plays an important role. It leads to additional receiver penalty due to temporal spreading of optical signals travelling through optical fibers. An optical device that compensates for the dispersion is needed to restore the quality of the optical signal.

Another key element is an optical amplifier, which compensates for optical losses in a transmission link between transmitter and receiver. There are many known different types of optical amplifiers, such as Erbium-doped fiber amplifiers, semiconductor optical amplifiers, Raman amplifiers and optical parametric amplifiers. A number of optical devices can separately perform amplification, wavelength conversion, or dispersion compensation of the optical signal. In U.S. Pat. No. 5,274,495 an optical parametric amplifier is described. The optical amplifier provides phase matching between pump light and signal light. Time spreading of optical pulses due to chromatic dispersion of a transmission fiber can be compensated in a various ways. The most commonly used techniques are based on the dispersion compensation fibers and chirped Bragg gratings.

SUMMARY OF THE INVENTION

The present invention solves the problem with the necessity to use many different optical devices to achieve versatile processing of optical signals in an optical transmission system in order to provide network flexibility.

Duplicate optical information at a set of input wavelengths is provided by extracting a set of conjugate copy wavelengths from the set of input wavelengths. The input wavelengths and the conjugate copy wavelengths are used separately to provide network flexibility.

Optical information is sent at a set of input wavelengths through an optical network from a sending site. Optical information is processed at an optical parametric amplifier. The input wavelengths are mixed with an optical pump wavelength in the optical parametric amplifier. A set of optical Conjugate copy wavelengths are extracted from the set of input wavelengths in the optical parametric amplifier. As result, two sets of amplified wavelengths are created the set of amplified conjugate copy wavelengths and the set of amplified input wavelengths. The set of conjugate copy wavelengths separated from the set of input wavelengths. The set of conjugate copy wavelengths is sent to, and received by, a first receiving site.

An object of the invention is to combine several functions into one arrangement to provide an efficient transmission of optical information in order to create network flexibility.

Yet another advantage is the option to use the two sets of wavelengths carrying the same information, for redundancy purposes, and thereby appropriate safety to the system.

Yet another advantage is the possibility to contrary, traditional transponders, to perform wavelength conversion in the optical domain only.

Yet another advantage is that the redundant protection link, can be longer than the main transmission fiber link. If the main fiber breaks, the amplification and dispersion compensation features of the idler channels at the conjugate wavelengths can be used to achieve the desired performance without additional amplifiers and dispersion compensation elements.

The invention will now be described more in detail with reference to exemplifying embodiments thereof and also with reference to accompanying drawings.

DESCRIPTION OF PREFERRED EXAMPLE EMBODIMENTS

Figure 1:
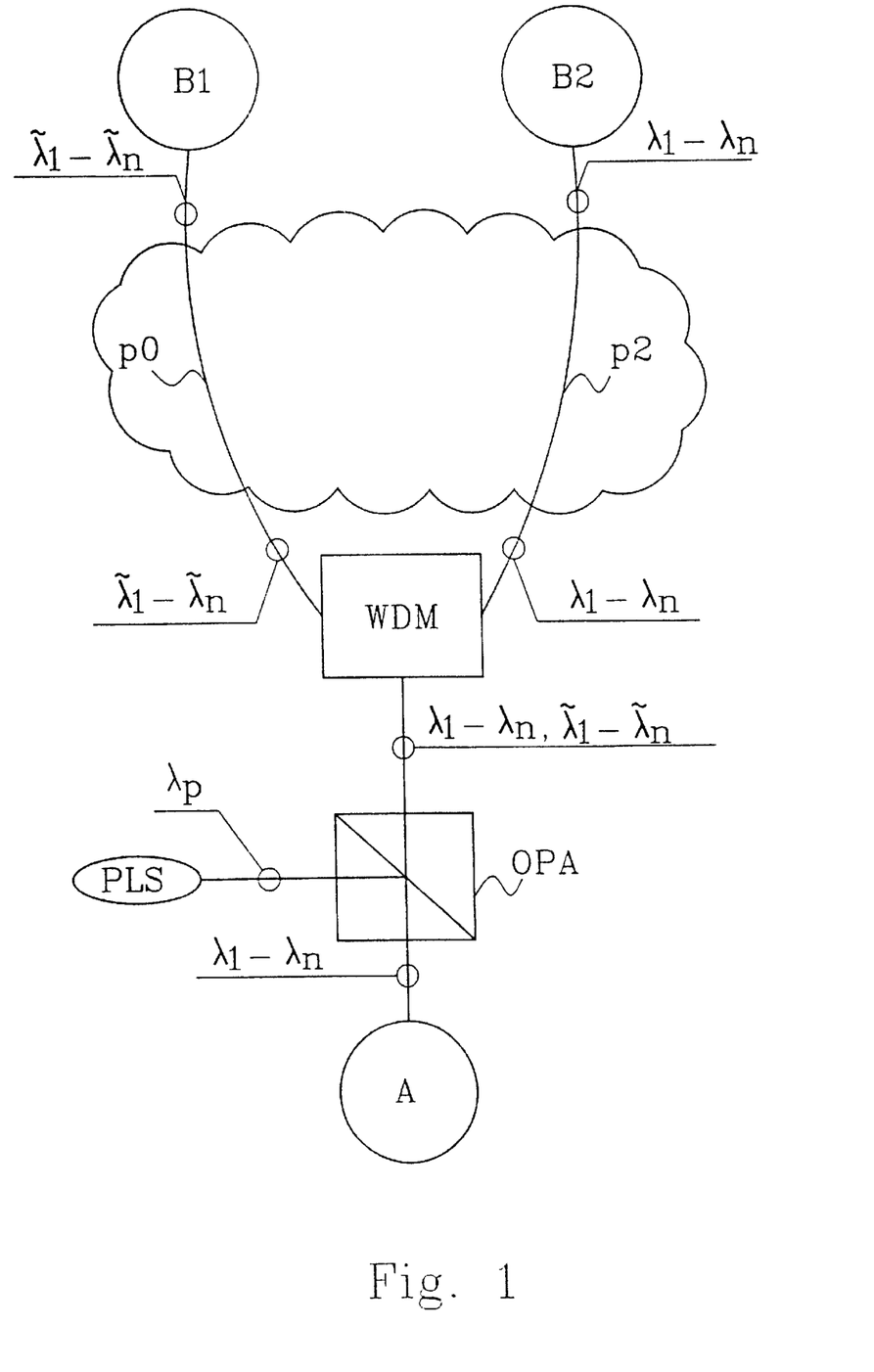
FIG. 1 is a block schematic illustration of a part of a Wavelength Division Multiplexing optical network comprising one sending site and two receiving sites.

FIG. 1 discloses a WDM optical network (WDM: Wavelength Division Multiplexing). Wavelength Division Multiplexing combines a set of traffic-carrying optical signals onto a single fiber pair. These signals must not interact with each other during transmission and must be separated for reception at the far end. These requirements are met by operating each optical signal on a separate wavelength. In FIG. 1 shows one sending site A connected to two receiving sites B1 and B2 via sites (not shown in the optical WDM network symbolized as a cloud symbol. The sending site A is connected to an input of an optical parametric amplifier OPA. A Pump Light Source PLS is connected to another input of the optical parametric amplifier. The optical amplifier OPA converts an input signal consisting of several WDM channels at a set of input wavelengths ($\lambda_1 \lambda_n$) and generates idler channels with the same input signal information but at corresponding conjugate copy wavelengths ($\lambda_-$ $\tilde{\lambda}_n$). This is further explained later in FIG. 2. An output of the optical amplifier OPA is connected to an input of a WDM splitter. The WDM splitter divides the optical input signal carrying the input wavelengths and the conjugate copy wavelengths; into two parts. Each part carries one of the input wavelengths and the conjugate wavelengths and is transmitted to one of the receiving sites B1 and B2. The WDM splitter can be either separated from or a part of the optical parametric amplifier OPA. The two output signals, and the conjugate wavelengths pass other sites in the WDM network on their way to the receiving sites B1 and B2.

Figure 2:
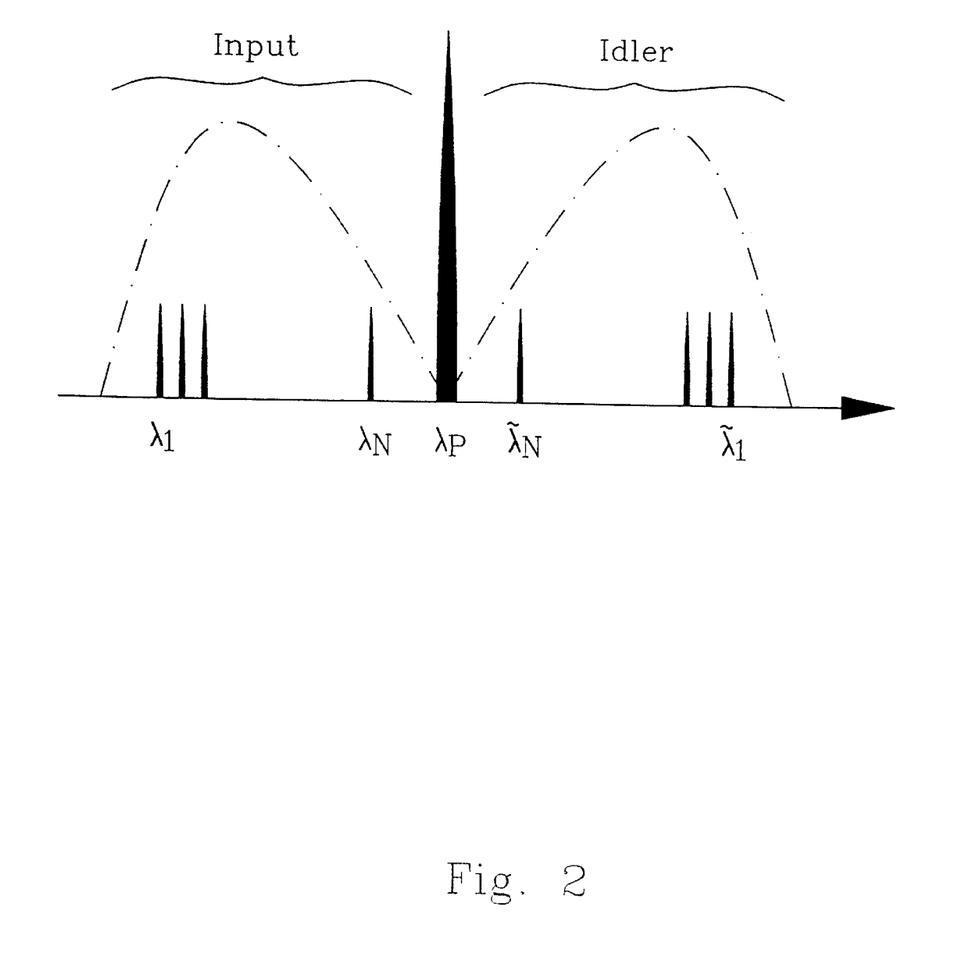
FIG. 2 is a diagram showing how several idler wavelengths are generated out of several WDM input wavelengths.

FIG. 2 is a diagram showing the OPA output after mixing an input signal with a pump wave signal Parametrical amplification occurs due to nonlinear interaction of pump irradiation with an input signal in optically nonlinear medium. Thus, the optical parametrical amplifier mainly includes two parts: a pump source and a gain medium. The operational principle of an optical parametrical amplifier of four wave mixed light, which is a well known phenomenon, is specifically shown in FIG. 2. As an example, an input optical signal with wavelength $\lambda_I$ is mixed with an optical pump wave at the wavelength $\lambda_p$ in a strongly nonlinear optical material which is not necessarily a fiber. During mixing, the input signal is amplified, and an idler signal at the wavelength $\lambda_I$ is generated, where $1/\tilde{\lambda} = 2/\lambda_p - 1/\lambda_I$. If the input signal consists of several WDM channels $\lambda_I \lambda_n$, several idler signals $\lambda_I$–$\lambda_n$ with corresponding wavelengths will be generated. The idler signals are a copy of the optical information carried by the input signals, and the magnitude is comparable to the magnitude of the amplified signal. Thus, two sets of amplified WDM-signals, input and idler, carrying the same information are available at the output of OPA.

Figure 3:
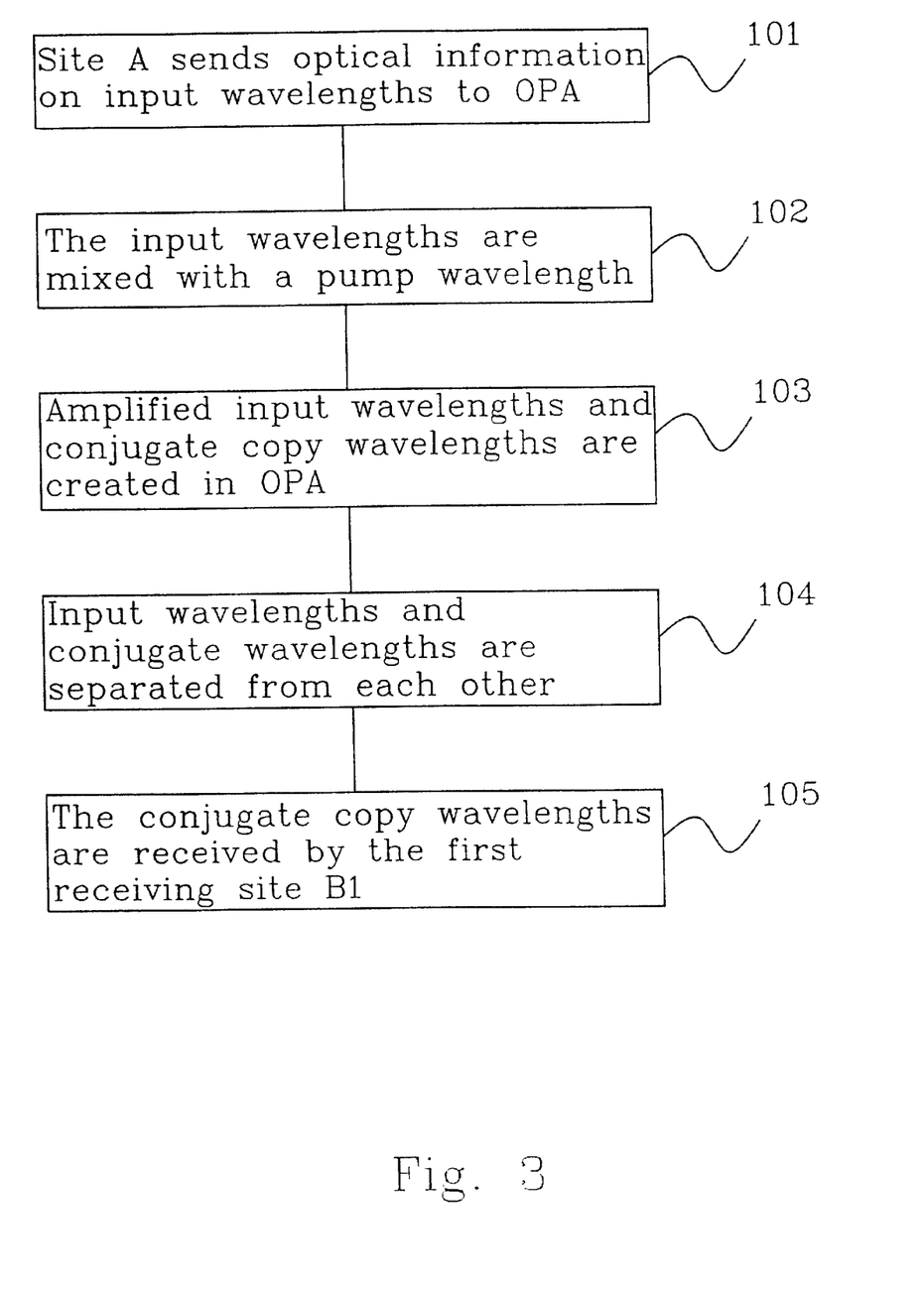
FIG. 3 is a flow chart disclosing the most important steps of a method to transfer optical information from one site to another.

Referring to the flow chart in FIG. 3, a method in accordance with a first example embodiment will be described. In general, the sending site A transfers optical information at a set of conjugate copy wavelength to the first receiving site B1.

The sending site A sends optical information on a set of input wavelength channels –$\lambda_n$ to the optical parametric amplifier OPA. Each channel is corresponds to one of the input wavelengths (block 101).

In the optical parametric amplifier OPA, the input wavelengths $\lambda_I \lambda^n$ are mixed with an optical pump wavelength $\lambda_p$ (block 102).

A set of optical amplified conjugate copy wavelengths $\lambda_I$ –$\lambda_n$ is generated in the optical parametric amplifier OPA. The conjugate copy wavelengths are extracted from the set of amplified input wavelengths $\lambda_I$–$\lambda_n$ (block 103).

The set of input wavelengths $\lambda_I$–$\lambda_n$ is separated in the WDM splitter from the set of conjugate copy wavelengths $\lambda_I$–$\lambda_n$ (block 104).

The set of conjugate copy wavelengths $\lambda_I$–$\lambda_n$ is received by a first receiving site B1. (block 105) on.

Each idler at wavelength $\lambda_I$–$\lambda_n$ is a conjugate copy of the input signal $\lambda_I$–$\lambda_n$ because its optical spectra are center symmetrical relative to the optical pump frequency. If the input signal has a frequency chirp the idler signal will have an opposite frequency chirp and the same pulse shape. This inversion of the signal chirp can be used for dispersion compensation accumulated by the input signal $_I$–$\lambda_n$ which has propagated a certain distance in the fiber link before it arrives at the optical parametric amplifier OPA. The effect of chromatic dispersion causes optical pulse spreading due to different speeds of propagation of group elements of the pulse having different optical frequencies. As a result, the pulse spreading is accompanied by frequency chirp increasing with the propagation distance. In case of negative group velocity dispersion, higher optical frequencies propagate faster, and therefore the optical frequency monotonically decreases from leading to trailing front of the pulse. The idler, which is generated in the optical parametrical amplifier OPA from such a chirped signal has an opposite chirp, i.e., its leading front has a lower optically frequency then the trailing edge. Due to reversed chirp the leading front of the idler pulse will travel slower than the trailing edge, and therefore it will be compressed due to effect of fiber dispersion. When the idler pulse propagates the same distance in fiber of the same type (generally speaking the same dispersion distance) as initial pulse did, the initial shape of the pulse would be restored. Thus, the optical parametrical amplifier simultaneously compensates for both dispersion and dispersion slope. Common dispersion fibers do not always compensate for dispersion slope.

Figure 4:
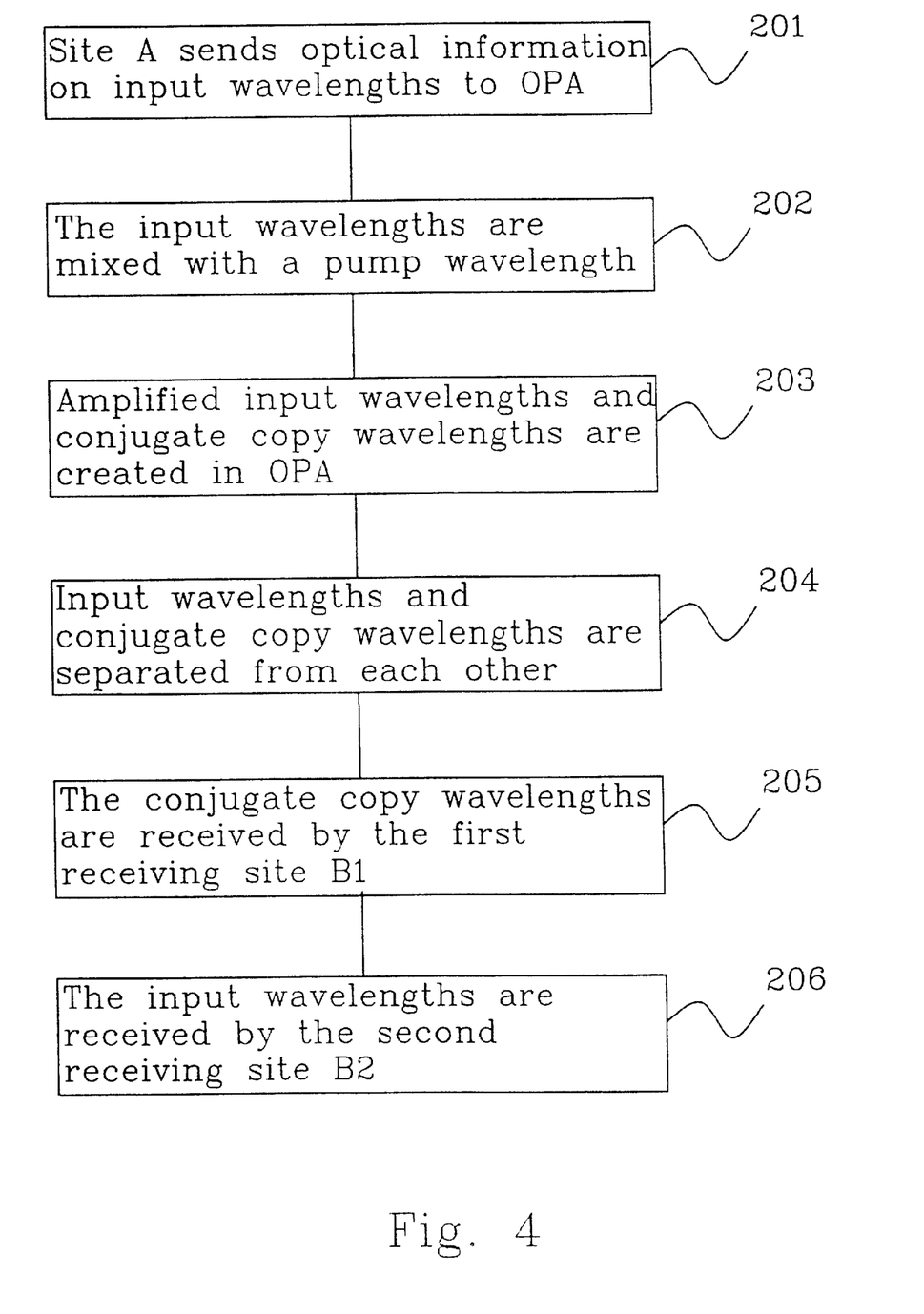
FIG. 4 is a flow chart disclosing the most important steps of a method to transfer optical information from one site to two receiving sites.

A method according to a second example embodiment will now be described, using a flow chart in FIG. 4. The sending site A transfers optical information at a set of conjugate copy wavelengths to the first receiving site B1. The same optical information is also transferred at a set of input wavelengths to a second receiving site B2.

The sending site A sends optical information on a set of input wavelength channels $\lambda_I$–$\lambda_n$ to the optical parametric amplifier OPA.

Each channel is transferred at one input wavelength. (block 201).

In the optical parametric amplifier OPA, the input wavelengths $\lambda_I$–$\lambda_n$ are mixed with an optical pump wavelength $\lambda_p$ (block 202).

A set of optical amplified conjugate copy wavelengths $\lambda_I$–$\lambda_n$ are generated in the optical parametric amplifier OPA. The conjugate copy wavelengths are extracted from the set of amplified input wavelengths $\lambda_I$–$\lambda_n$ (block 203).

The set of input wavelengths $\lambda_I$–$\lambda_n$ are separated from the set of conjugate copy wavelengths $\lambda_I$–$\lambda_n$ (block 204).

The set of amplified conjugate copy wavelengths $\lambda_I$–$\lambda_n$ is received by the first receiving site B1. (block 205).

The second receiving site B2 receives the set of amplified input wavelengths $\lambda_I$ –$\lambda_n$ (block 206).

The amplified conjugate copy wavelengths, i.e. the idler, sent to the first receiving site B1, and the amplified input wavelengths, i.e. the input, are sent to the second receiving site B2. The generation of the idler with a converted set of wavelengths from a set of input wavelengths is similar to the functioning of a transponder. Depending on particular conditions or requirements, signals with $\lambda_I$ or $\lambda_I$ are transmitted on one or another link. Contrary to traditional transponders, wavelength conversion takes place in the optical domain only. The whole set of wavelengths is converted simultaneously by one device, while the transponder is hardware adjusted for each particular wavelength. The performance of the optical amplifier OPA wavelength converter is not limited by high bit rates of an optical signal. This is an advantage when comparing the optical amplifier OPA wavelength converter with a traditional transponder.

Figure 5:
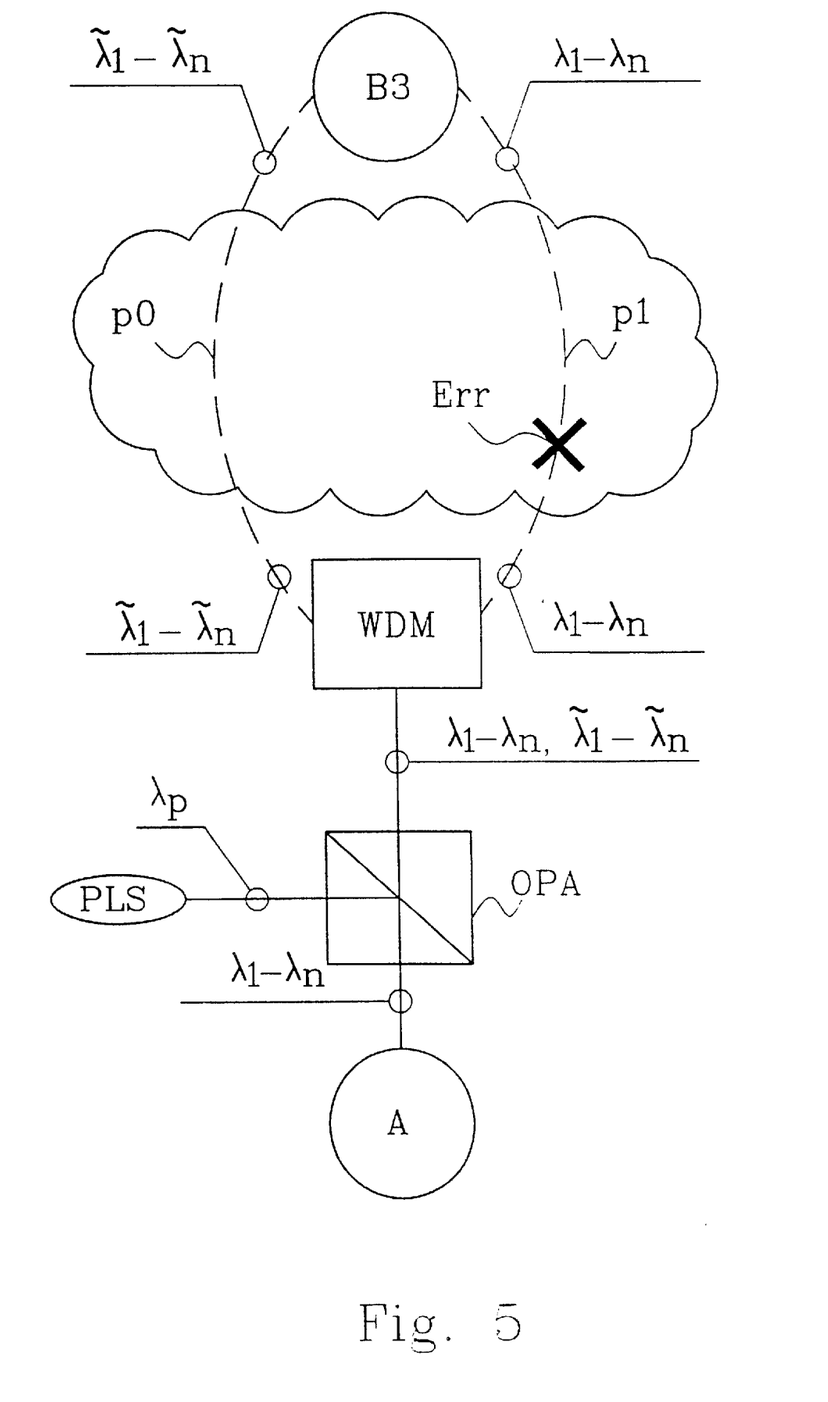
FIG. 5 is a block schematic illustration of a part of a Wavelength Division Multiplexing optical network with one sending site and one receiving site.

FIG. 5 can be seen how shows the sending site A connected to one receiving site B3. Like in FIG. 1, the sites are connected to each other via other sites, symbolized by a cloud. The sending site A is connected to an input of an optical parametric amplifier OPA. A Pump Light Source PLS is, like in FIG. 1, connected to another input of the optical parametric amplifier. The optical amplifier OPA converts an input signal consisting of several WDM channels at a set of input wavelengths and generates idler channels. An output of the optical amplifier OPA is connected to an input of a WDM splitter. The WDM splitter divides the optical input signal carrying the input wavelengths and the conjugate copy wavelengths into two parts.

The two parts, carrying the input wavelengths and the conjugate wavelengths, are transmitted to the same receiving site B3 but on separate optical paths P0 and P1. The conjugate copy wavelengths are transferred on the path P0 while the input wavelengths are transferred on the path P1.

Figure 6:
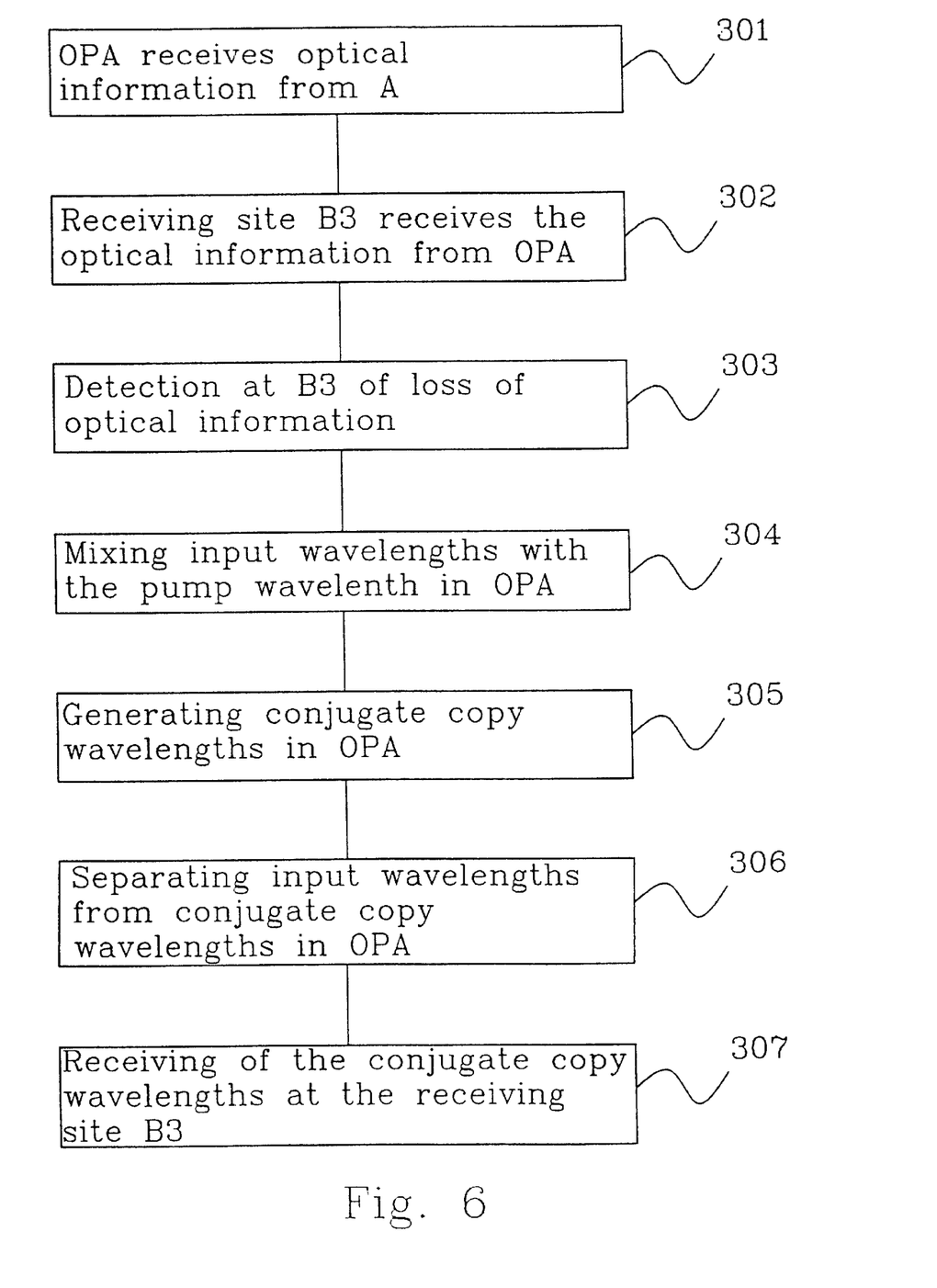
FIG. 6 is a flow chart disclosing the most important steps of a method to redundant transfer optical information from a sending site to a receiving site.

A third example embodiment is described in conjunction with a flow chart in FIG. 6. The sending site A transfers optical information at a set of conjugate copy wavelength to the receiving site B3. At the beginning of the procedure, the optical parametric amplifier OPA is deactivated, and information is transferred transparently through the optical parametric amplifier OPA at the input wavelengths $\lambda_1 - \lambda_n$ from site A on the path P1 to the receiving site B3. After a path error, the optical amplifier OPA is activated, and the information is instead transferred at the conjugate copy wavelengths $\lambda_1 - \lambda_n$. The error in the path is shown with an X-symbol on the path p1.

The optical parametric amplifier OPA receives the optical information at the input wavelengths $\lambda_1 - \lambda_n$ (block 301).

The receiving site B3 receives the optical information at the wavelengths $\lambda_1 - \lambda_n$ transparently sent via the optical parametric amplifier OPA. (block 302).

The receiving site B3 detects loss of received optical information. (block 303).

the optical parametric amplifier OPA, the input wavelengths $\lambda_1 - \lambda_n$ are mixed with an optical pump wavelength $\lambda_p$ (block 304).

In the optical parametric amplifier OPA, a set of optical conjugate copy wavelengths $\lambda_1 - \lambda_n$ are extracted from the set of input wavelengths $\lambda_1 - \lambda_n$ (block 305).

The set of input wavelengths $\lambda_1 - \lambda_n$ are separated from the set of conjugate copy wavelengths $\lambda_1 - \lambda_n$ (block 306).

The receiving site B3 receives the set of conjugate copy wavelengths $\lambda_1 - \lambda_n$ (block 307).

The optical parametric amplifier OPA with a WDM splitter is used as a protection switch in case of a main fiber line failure. In a normal operation, when the optical data is transmitted throughout a main transmission line by the input wavelengths, the optical pumping of the optical amplifier OPA is switched off. The amplifier is transparent when it is not pumped, and all the information is transmitted via path P1 without substantial losses. In the case of a main line failure, the OPA is activated by the pump PLS, and all information is routed into the path P0 on conjugate wavelengths. The protection link can be longer than the main transmission fiber line, and therefore the amplification and dispersion compensation features of the idler channels at the conjugate wavelengths $\lambda_1 - \lambda_n$ can be very useful to achieve the desired performance without additional amplifiers and dispersion compensation elements.

Figure 7:
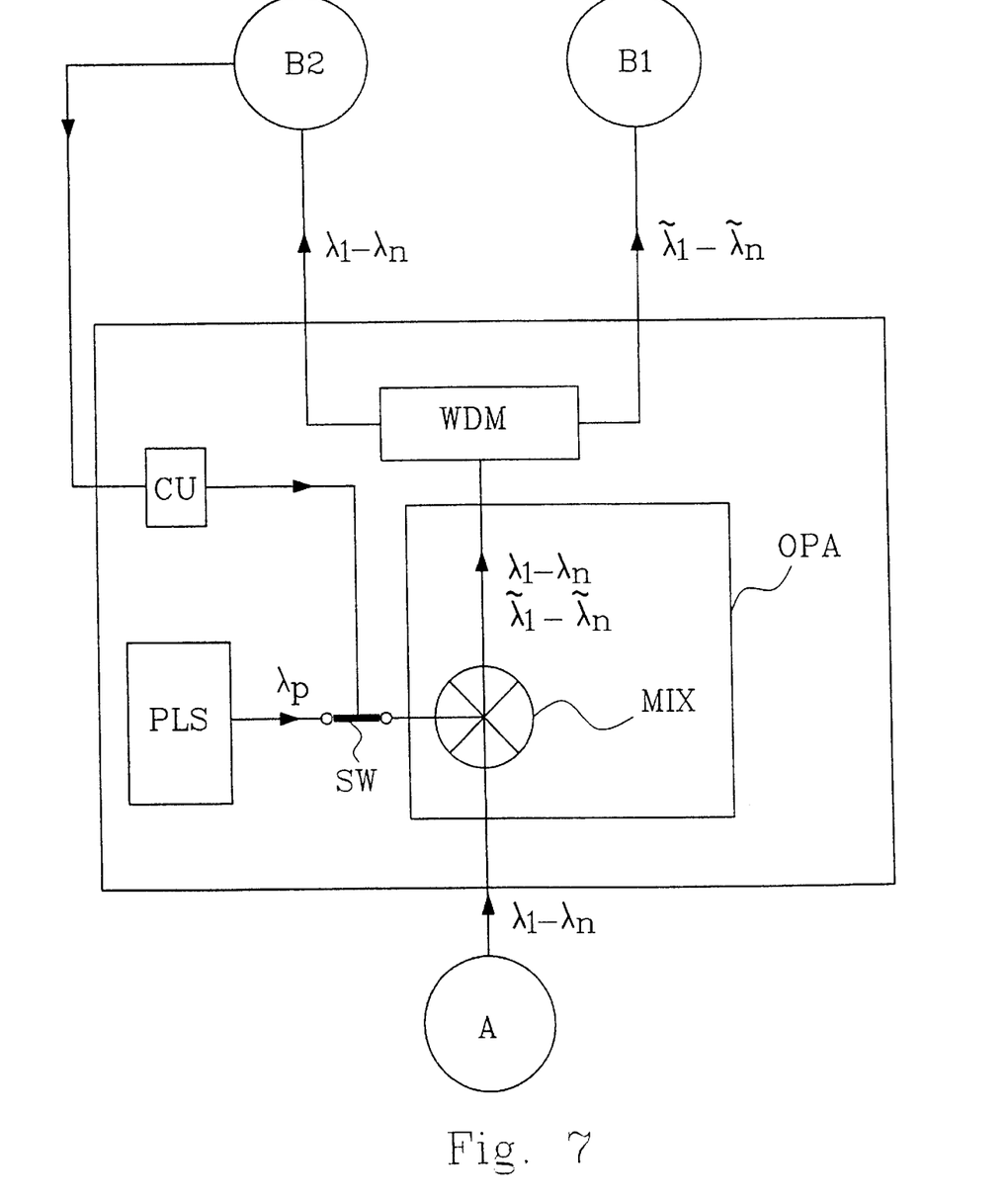
FIG. 7 is a block schematic illustration of an arrangement according to the invention.

FIG. 7 discloses another arrangement according to the invention. An optical parametrical amplifier OPA comprises a mixer MIX. Optical information at input wavelengths $\lambda_1 - \lambda_n$ from a sending site A is mixed in the mixer with a pump wavelength $\lambda_1$. The pump signal comprising the wavelength $\lambda_p$ is generated by a pump light source PLS. The output from the mixer is an optical signal comprising a set of amplified input wavelengths $\lambda_1 \div \lambda_n$ together with a set of amplified conjugate copy wavelengths $\lambda_1 - \lambda_n$. The two sets of wavelengths $\lambda_1 - \lambda_n$ and $\lambda_1 - \lambda_n$ are divided into two parts in a WDM splitter. The two sets of wavelengths are transferred on separate optical paths to receiving sites B 1 and B2; alternatively, both sets of wavelengths may be transferred to the same receiving site. A control unit CU is prepared to receive a signal from one receiving site, indicating a loss of optical data. A control signal from the control unit CU affects a switch SW to controls sending or not sending of the pump signal from the pump light source PLS to the optical parametrical amplifier OPA. The switch function is only schematically drawn in the figure.

Different variations are possible within the scope of the invention. For example, the different modules are not necessarily located where they have been disclosed in the figures. The WDM splitter can be a part of the optical parametrical amplifier OPA. The control unit CU can also for example be a part of the pump light source PLS. The invention is in other words not restricted to the above described and illustrated example embodiments, and modifications can be made within the scope of the claims.

What is claimed is:

1. A method for processing optical information sent at a set of input wavelengths in an optical network from a sending site, comprising:

receiving the optical information at the set of input wavelengths at an optical parametric amplifier;

sending to a first receiving site the optical information at the set of input wavelengths via the optical parametric amplifier;

detecting at the receiving site a loss of the received optical information at the set of input wavelengths;

after detecting the loss, mixing in the optical parametric amplifier the input wavelengths with an optical pump wavelength;

generating in the optical parametric amplifier a set of optical conjugate copy wavelengths from the set of input wavelengths that also contain the optical information;

separating the set of input wavelengths from the set of conjugate copy wavelengths; and sending to the receiving site or another receiving site the optical information at the set of conjugate copy wavelengths as a result of the detected loss of optical information at the receiving site.

2. The method in claim 1, wherein the optical information is sent using the set of input wavelengths to the first receiving site over a first path and the optical information is sent using the set of conjugate wavelengths to the first receiving site over a second path.

3. The method in claim 2, wherein the second path is longer than the first path.

4. An arrangement for processing optical information sent through an optical network from a sending site to a receiving site, comprising:

an optical parametric amplifier for receiving the optical information sent at the set of input wavelengths;

a mixer in the amplifier for mixing the input wavelengths with an optical pump wavelength;

a generator for generating a set of optical conjugate copy wavelengths from the set of input wavelengths that also contain the optical information;

a separator for separating the set of input wavelengths from the set of conjugate copy wavelengths;

a sender for sending the optical information at the set of input wavelengths to the receiving site;

a controller for detecting a loss of reception of optical information at the receiving site;

a switch controlled by the controller when the reception loss is detected to enable the mixer to mix the input wavelengths with the optical pump wavelength so that the sender sends the optical information at the set of conjugate copy wavelengths.

5. The arrangement in claim 4, wherein the optical information is sent using the set of input wavelengths to the first receiving site over a first path and the optical information is sent using the set of conjugate wavelengths to the first receiving site over a second path.

6. The arrangement in claim 5, wherein the second path is longer than the first path.

7. The arrangement in claim 4, wherein the optical information is sent using the set of input wavelengths to the first receiving site over a first path and the optical information is sent using the set of conjugate wavelengths to another receiving site over a second path.

* * * * *